United States Patent Office 3,400,117
Patented Sept. 3, 1968

3,400,117
PROCESS FOR THE PREPARATION OF FUMARATED ROSIN SIZE OF LOW CRYSTALLIZING AND LOW FOAM - PRODUCING PROPERTIES
Michael Joseph D'Errico and Russell Joseph Kulick, Stamford, Conn., assignors to American Cyanamid Company, Stamford, Conn., a corporation of Maine
Continuation-in-part of application Ser. No. 328,427, Dec. 5, 1963. This application Mar. 3, 1966, Ser. No. 536,538
3 Claims. (Cl. 260—97.5)

ABSTRACT OF THE DISCLOSURE

A fumarated methylolated rosin size is prepared by reacting at a temperature below 220° C. one portion of rosin with fumaric acid as fortifying agent, reacting a second portion of rosin with formaldehyde as anticrystallizing agent and heating the latter rosin at 250° C.–300° C. thereby dehydrating the methylol groups introduced into the rosin by the formaldehyde, mixing said portions of rosin and saponifying the mixture to form rosin size; the amounts of formaldehyde and fumaric acid being predetermined so that in the mixture of rosins which is saponified there is $\frac{1}{10}$ to $\frac{1}{3}$ mol of reacted formaldehyde and $\frac{1}{20}$ to $\frac{1}{5}$ mole of reacted fumaric acid per mol of free and reacted rosin present. The process permits a rosin size of superior brightness and sizing efficiency to be produced in compact apparatus with less expenditure of heating.

This is a continuation-in-part of our copending application Ser. No. 328,427, filed on Dec. 5, 1963, and now abandoned.

The present invention relates to an improved method for the manufacture of a rosin size fortified by a reacted content of fumaric acid and possessing excellent sizing efficiency as well as low foaming and crystallizing properties.

It is known that a fumaric acid-fortified rosin size can be prepared by reacting rosin with about $\frac{1}{20}$ to $\frac{1}{5}$ mol of fumaric acid at 200° C. and saponifying the product. It is further known that the tendency of the resulting size to crystallize on storage can be diminished by reacting the rosin (before saponification) with the same amount of formaldehyde; cf. Reaville et al., U.S. Patent No. 2,994,635 (1961).

It is a disadvantage of the process that the resulting rosin size causes an undesirable large amount of foam or "float" when it is used in the manufacture of paper. This is due to the presence of the reacted formaldehyde, because rosin size prepared from a rosin which has only been fumarated is substantially unchanged as to its foaming properties. The formaldehyde reaction introduces methylol groups into the rosin, thereby imparting to it a latent foaming tendency, and it is evidently these groups which are principally responsible for the foaming tendency of the resulting size.

It is also known that the latent foaming tendency of the formaldehyde reaction products of the fortified adducts of rosin with α,β-unsaturated carboxylic acids such as maleic, acrylic, citraconic and itaconic, can be overcome by heating these adducts for about half an hour at 250–300° C. (cf. Strazdins U.S. Patent No. 3,132,127). However, when this treatment is applied to the reaction product of the rosin-fumaric acid adduct with formaldehyde, the water-resistance imparted to paper by size prepared from the reaction product decreases sharply.

The discovery has now been made that a rosin size of substantially unimpaired sizing efficiency and of substantially decreased tendency to cause foaming is obtained when the reaction of the rosin with the formaldehyde and with the fumaric acid is performed under such conditions that all of the rosin-formaldehyde product is heated above 250° C., and none of the rosin-fumaric product is heated above about 220° C.

According to one method, the rosin is divided into two portions. One poriton is reacted with the fumaric acid and this portion is not heated above the temperature at which isomerization of the adduct takes place.

The minimum temperature at which rosin reacts tolerably fast with fumaric acid is about 180° C. The reaction is performed at a temperature above that temperature and below the temperature at which the rosin-fumaric acid adduct isomerizes. The latter temperature is about 220° C., and is hereinafter termed the "adduct isomerization temperature."

The second portion of the rosin is reacted with the formaldehyde at any suitable temperature, preferably below about 230° C., and this portion is heated to 250° C.–300° C. to dehydrate and thereby destroy the methylol hydroxyl groups which are introduced into the rosin by the formaldehyde.

The resulting portions of rosin are then mixed and the mixture is saponified to form rosin size. If preferred, the portions can be saponified separately and the resulting sizes can be mixed. The results are substantially the same in either instance.

The preferred temperature to which the formaldehyde-treated rosin is heated does not significantly impair the value of the rosin as anticrystallizing agent.

The further discovery has been made that a rosin size which is substantially the same as the size prepared as described above not merely as to its high efficiency and low foaming tendency but as to its color as well is prepared by a process which comprises reacting a small portion of rosin with a large amount of formaldehyde, heat-treating said portion at 250°–300° C. as described, reacting a large portion of rosin with a normal amount of fumaric acid at an adduct nonisomerizing temperature below 220° C., and blending and saponifying the products. A particularly beneficial consequence of this procedure is that the amount of rosin which is heat-treated is minimized with the result that the product has better color at decreased cost. When following this procedure, we prefer to react the first portion of rosin with $\frac{2}{3}$ to 1 mol of formaldehyde, to react the second portion of rosin with $\frac{1}{5}$ to $\frac{1}{10}$ mol of fumaric acid, and to combine the portions in weight ratio between $\frac{1}{2}$:1 and $\frac{1}{10}$:1 so as to form a rosin mixture having a content of reacted formaldehyde and reacted fumaric acid respectively equivalent to between $\frac{1}{10}$ and $\frac{1}{3}$ mol of formaldehyde and $\frac{1}{20}$ and $\frac{1}{5}$ mol of fumaric acid.

The rosin size produced by the process has very little tendency to crystallize on storage, and has very little tendency to cause foaming when employed with alum as a beater additive in the manufacture of paper. It is highly efficient as a size and imparts excellent water-resistance to paper.

According to the second method, substantially the same results can be achieved by reacting rosin at any suitable temperature with formaldehyde as anticrystallizing agent for the rosin size to be formed at a convenient temperature and heating the resulting rosin to 250° C.–300° C. thereby dehydrating the methylol hydroxyl groups introduced by the formaldehyde, cooling the thus treated rosin, reacting the rosin at an adduct nonisomerization temperature with fumaric acid as fortifying agent for the rosin size to be formed, and saponifying the product to form rosin size.

According to this method the rosin is reacted with the formaldehyde and with the fumaric acid in consecutive steps, and is not divided into portions.

Both methods are characterized in that the formaldehyde-treated rosin is heated in the absence of reacted fumaric acid to 250°–300° C. to decompose the methylol group therein, and during and after the reaction of the rosin with the fumaric acid the rosin is not heated at or above the temperature at which the rosin-fumaric adduct isomerizes.

The rosins treated by the invention may be any of the rosins used for the manufacture of rosin size. The invention is particularly usefully employed in conversion with tall oil rosin because this rosin, when converted into a size, crystallizes with very great speed and because when the crystallization is suppressed by reaction of the rosin with formaldehyde and the treated rosin is saponified, the resulting size causes very considerable foaming in the paper-making operation.

The process details are further discussed in connection with the drawings, wherein.

Figure 1:
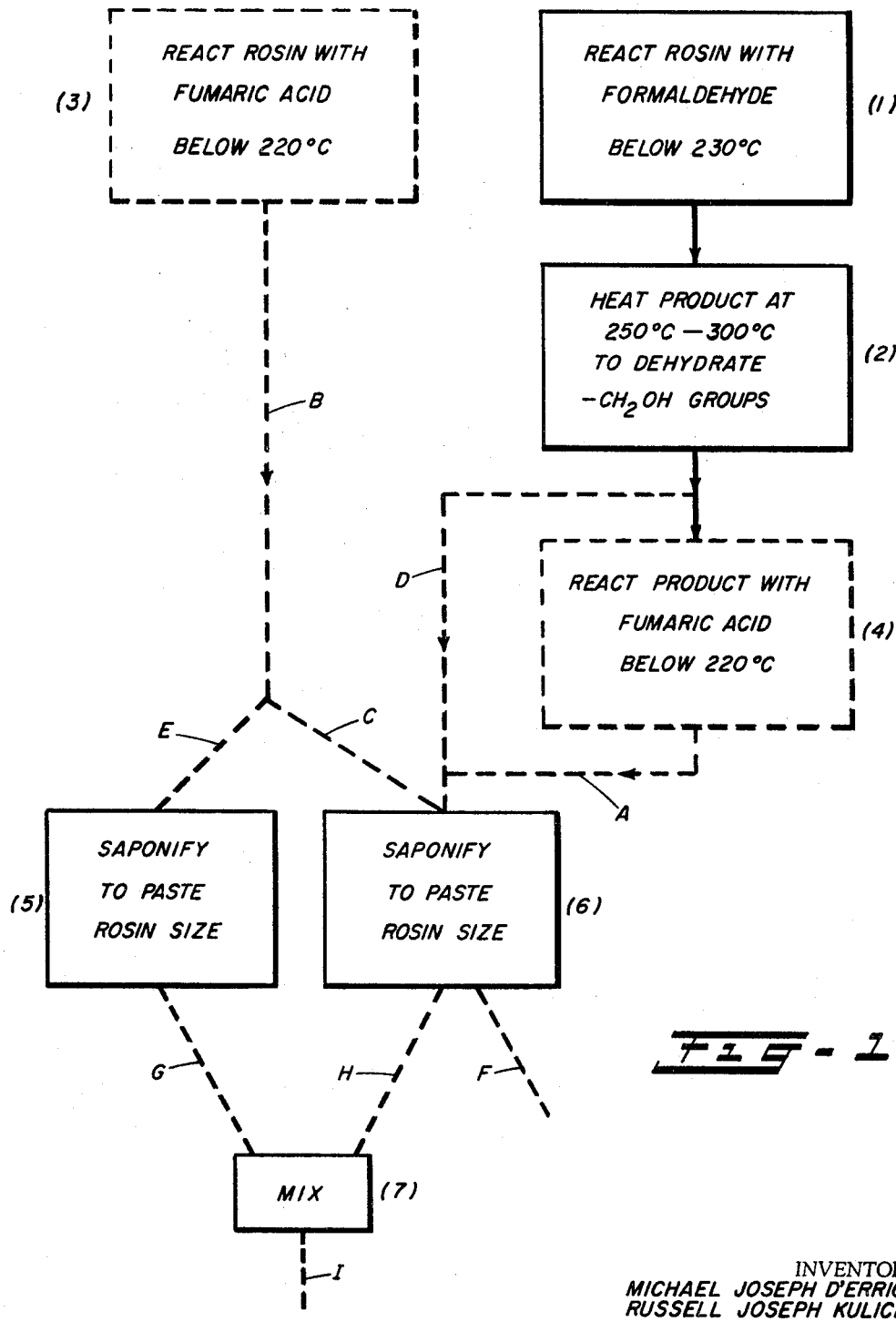
FIG. 1 is a flow sheet showing a number of embodiments of the process.

In FIG. 1, in every instance as shown by box 1, one portion of rosin is reacted with formaldehyde at a temperature below 230° C. This is the temperature at which dehydration of methylol groups commences, and it is preferred to react the rosin with the formaldehyde at a temperature far below this point, the range of 140° C.–180° C. being best for the purpose.

In every instance, as is shown by box 2, the resulting rosin is heated sufficiently to decompose the hydroxyl groups introduced by the formaldehyde. This occurs in the range of 250° C.–300° C. The temperature of 270° C. is preferred because at this point rapid and complete dehydration of the hydroxyl groups occurs, without significant decarboxylation of the rosin.

Preferably but not necessarily, as shown by box 3 in dotted lines, a second portion of rosin is reacted with fumaric acid to form the Diels-Alder adduct at a temperature below which the adduct isomerizes. This isomerization occurs at about 220° C. We prefer to perform the reaction at about 200° C. at which temperature the reaction takes place at satisfactory speed without isomerization of the adduct to the maleic state.

Alternatively, as is shown by box 3 in dotted lines, the reaction may be performed without recourse to a second batch of rosin, by reacting the fumaric acid with the heat-treated rosin-formaldehyde product of box 2.

In the next step, the product or products are saponified. Where the course of the procedure has followed the reaction scheme indicated by boxes 1, 2 and 4, the product is saponified directly as shown by flow line A and the resulting paste rosin size is discharged to storage as shown by flow line F.

Where the course of the procedure has followed the reaction scheme indicated by boxes 1, 2 and 3, the products may be premixed and saponified as shown by flow lines B, C and D, or they may be saponified separately and the saponification products may be mixed as shown by flow lines B, E, G and H and by boxes 5 and 6 and may be discharged to storage through line I.

When the method is adopted it employs two portions of rosin, the portions may be the same or different in size. In general, we have found it more efficient to divide the rosin into portions having a weight ratio of about 1:3 and to react the larger portion with the formaldehyde and the smaller with the fumaric acid, because the formaldehyde reaction proceeds more rapidly than the reaction of the rosin with the fumaric acid and an economy is effected in the use of equipment. In such event, the concentration of fumaric acid in the other portion is generally high, and the adduct has a high flow point. In such event, it will generally prove more convenient to mix the two portions of treated rosin before saponification so as to provide a mixture which can be saponified without need for an autoclave or a solvent.

The step of saponifying the treated rosins (or the mixture of rosin) is performed in any convenient manner so as to form paste rosin size as the end product. When the rosin-treating method employed is the one which produces two portions of treated rosin, it is generally convenient to mix the two portions and to allow the single mixture to flow into an aqueous alkali metal alkali solution of predetermined composition so as to produce a paste rosin size of 77% solids and 15% free acid content.

Figure 2:
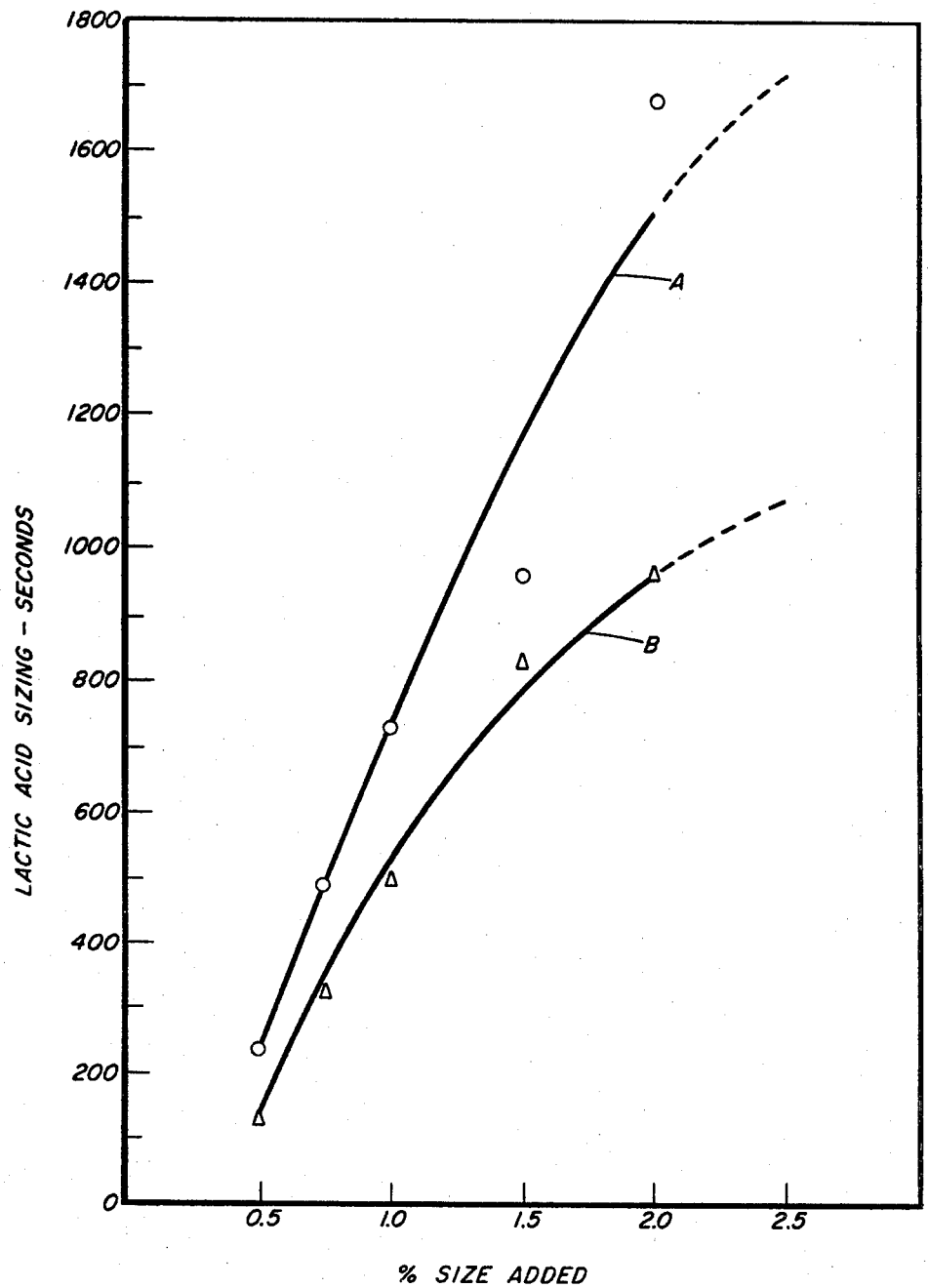
FIG. 2 is a sheet containing two curves which show the comparative efficiency of a typical size produced by the process as a function of the amount of size employed.

FIG. 2 illustrates the comparative efficiency of a typical size produced by the process For this comparison, two rosin sizes were prepared.

One size (a preferred size of the present invention) was prepared by dividing 100 parts of N grade tall oil rosin into two portions of 1:3 weight ratio.

To the smaller portion was added 16% of its weight of fumaric acid; the mixture was maintained at 200° C. for 45 minutes at the end of which time the fumaration reaction was complete.

To the second portion was added 2% of its weight of paraformaldehyde, and the mixture was maintained at 160° C. for 20 minutes, at which time reaction of the paraformaldehyde with the rosin was complete. The product was then heated for 30 minutes at 270° C. to dehydrate the methylol hydroxyl groups thereby introduced into the rosin.

The two rosin products were mixed and the mixture was saponified to form paste rosin size of 77% total solids and 13% free rosin acids. The resulting rosin contained 4% of fumaric acid and 1.5% of formaldehyde based on the initial 100 parts of rosin.

The resulting size (size A) was tested according to standard laboratory method by forming an aqueous suspension of a 50:50 mixture of well-beaten bleached hardwood, bleached softwood fibers at a consistency of 0.6%, removing aliquots, treating the aliquots with varying amounts of the size and proportionate amounts of alum, and forming the suspensions at pH 4.7 into handsheets at basis weight of about 200 lb. per 25" x 40"/500 ream.

The sizing of the resulting samples was determined with 20% aqueous lactic acid solution applied at 100° F. under a head of 12" by penescope. The results are plotted in FIG. 2 as curve A.

Size B was prepared by reacting 100 parts by weight of N grade tall oil rosin with 1.5 parts of paraformaldehyde at 160° C. for 20 minutes and reacting the product with 4 parts of fumaric acid at 200° C. This rosin contained 4% of fumaric acid and 1.5% by weight of formaldehyde based on the initial weight of the rosin. The mixture was then heated at 270° C. for 30 minutes and then saponified in the same manner as the material of run A.

The results are plotted in FIG. 2 as curve B.

The chief difference between the sizes is that in the preparation of size A, the rosin-fumaric acid adduct was not heated above 220° C., whereas in the preparation of size B the rosin-fumaric acid adduct was heated at 270° C. for 30 minutes. The consequence of this was that, as is illustrated in the curves shown in the attached drawing, about 1.1% of size A produced 800 seconds of sizing whereas about 1.5% of size B was needed to achieve the same result.

The invention is more particularly illustrated by the examples which follow. These examples are preferred embodiments of the invention and are not to be construed as limitations thereon.

EXAMPLE 1

The following illustrates a preferred method for the preparation of paste rosin size according to the present invention.

To 302 g. (1 mol) of gum rosin at 200° C. is added 46.5 g. (0.4 mol) of fumaric acid. Formation of the Diels- Alder adduct is complete at the end of two hours without isomerization of the adduct.

To 1020 g. (3.4 mol) of gum rosin at 140° C. in an open vessel is added 10.4 g. (0.33 mol) of paraformaldehyde (equivalent to 0.1 mol of paraformaldehyde per mol of rosin). Formation of methylol rosin is complete in 30 minutes. The charge is then heated to 270° C. and maintained at that temperature for 30 minutes, at the end of which time dehydration of the methylol groups of the rosin and escape of water and volatile organic matter are substantially complete. The charge is cooled to below 200° C. and is mixed with the fumarated rosin.

The mixture of rosins is slowly poured with vigorous agitation into 320 g. of 40% aqueous sodium hydroxide solution at 85° C. After 15 minutes of stirring, saponification is substantially complete.

The product is virtually noncrystallizing when stored at 71° C. and causes very little foam when applied by the beater addition method with alum.

EXAMPLE 2

The foregoing procedure is repeated using tall oil rosin as the starting material. Results are substantially the same.

EXAMPLE 3

The following illustrates the preparation of rosin size by a particularly efficient process according to the present invention, which minimizes the degradation in the color of the rosin which is caused by the step of heat-treating the rosin-formaldehyde condensate at 270° C. as described above.

300 g. (1 mol) of tall oil rosin (N grade) is heated to 140° C. in an autoclave equipped with stirrer and 22.5 gm. (¾ mol) of crushed paraformaldehyde is added. The autoclave is immediately closed and is maintained at 140° C. for 30 minutes with stirring. The charge is then rapidly heated to 270° C. and is maintained there for 30 minutes. The autoclave is then allowed to cool to 150° C., at which point it is vented.

At the same time, 1200 g. of the same tall oil rosin (N grade) is reacted with 60 g. (approx. ⅛ mol equivalent) of fumaric acid by mixing the two components and heating at 200° C. for 1 hour. The product is then blended with the formaldehyde-reacted rosin.

The color of the blend is lighter than the color of the blend from which Size A (described above) was prepared.

The blend is saponified by standard laboratory procedure to form a paste rosin size containing 75% solids and 15% free rosin acids.

The size possesses substantially the same sizing efficiency and low foaming properties as the size of Size A.

In this method, only 20% of the rosin is subjected to a temperature in excess of 200°–220° C.

We claim:

1. A process for the preparation of fumarated rosin size which consists essentially in:
    (1) mixing
        (a) the Diels-Alder adduct produced by reacting at a temperature below 220° C. rosin with fumaric acid as fortifying agent for the rosin size to be formed with
        (b) the product produced by
            (i) reacting rosin with formaldehyde at a temperature below 230° C. as anticrystallizing agent for the rosin size to be formed thereby introducing methylol groups into said rosin, and
            (ii) thereafter heating (i) to a temperature of 250° C.–300° C. thereby dehydrating said methylol groups; and
    (2) saponifying the mixture to form rosin size; the amount of said formaldehyde and said fumaric acid being predetermined so that in said mixture of rosin there is ⅒ to ⅓ mol of reacted formaldehyde and ¹⁄₂₀ to ⅛ mol of reacted fumaric acid per mol of free and reacted rosin present.

2. A process for the preparation of fumarated rosin size consisting essentially in:
    (1) mixing
        (a) 1 part of the Diels-Alder adduct produced by reacting one mol of rosin with 0.1 to 0.4 mol of fumaric acid at a temperature below 220° C.; with
        (b) 0.1 to 4.0 parts of the product produced by
            (i) reacting one mol of rosin with 0.1 to 1.0 mol of formaldehyde at a temperature below 230° C., thereby introducing methylol groups into said rosin, and
            (ii) thereafter heating (i) to a temperature of 250° C. to 300° C., thereby dehydrating said methylol groups; and
    (2) saponifying the mixture to form rosin size.

3. A process for the preparation of fumarated rosin size consisting essentially in:
    (1) mixing
        (a) 1 part of a Diels-Alder adduct produced by reacting one mol of rosin with 0.1 to 0.2 mol of fumaric acid at a temperature below 220° C.; with
        (b) 0.1 to 0.5 part of a product produced by
            (i) reacting one mol of rosin with 0.67 to 1.0 mol of formaldehyde at a temperature below 230° C., thereby introducing methylol groups into said rosin, and
            (ii) thereafter heating (i) to a temperature of 250° C. to 300° C., thereby dehydrating said methylol groups; and
    (2) saponifying the mixture to form rosin size.

References Cited

UNITED STATES PATENTS

| | | | |
|---|---|---|---|
| 2,934,468 | 4/1960 | Strazdins | 162—180 |
| 2,994,635 | 8/1961 | Reaville et al. | 162—179 |
| 3,132,127 | 5/1964 | Strazdins | 260—97 |

DONALD E. CZAJA, *Primary Examiner.*

F. McKELVEY, *Assistant Examiner.*